United States Patent [19]

Ozawa et al.

[11] 4,401,725
[45] Aug. 30, 1983

[54] MAGNETIC RECORDING MEDIUM

[75] Inventors: Kazunori Ozawa, Tomiya; Takahiro Kawana; Nakaharu Seki, both of Tagajyo; Naoya Komada, Sendai, all of Japan

[73] Assignee: Sony Corporation, Tokyo, Japan

[21] Appl. No.: 415,346

[22] Filed: Sep. 7, 1982

[30] Foreign Application Priority Data

Sep. 14, 1981 [JP] Japan .................... 56-145182

[51] Int. Cl.³ ............................................ B32B 15/04
[52] U.S. Cl. .................................. 428/457; 428/694; 428/695; 428/900
[58] Field of Search ............... 428/694, 695, 900, 457

Primary Examiner—Bernard D. Pianalto

Attorney, Agent, or Firm—Hill, Van Santen, Steadman & Simpson

[57] ABSTRACT

A magnetic recording medium consisting of a non-magnetic substrate and a thin film metal magnetic layer is disclosed. The magnetic recording medium carries polyphenyl ether compound having the following formula

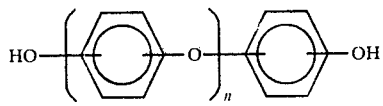

where n is an integer satisfying the following condition; $2 \leq n \leq 10$.

5 Claims, 3 Drawing Figures

MAGNETIC RECORDING MEDIUM

BACKGROUND OF THE INVENTION

1. Field of the Invention

The present invention relates generally to a magnetic recording medium, and more particularly a magnetic recording medium having a thin film of ferromagnetic metal formed on a non-magnetic substrate.

2. Description of the Prior Art

Recently, a thin film of ferromagnetic metal has been noted. A magnetic recording medium of this kind is made by such a manner that ferromagnetic metal or alloy is formed on a non-magnetic substrate by liquid-phase plating and the physical vapour deposition technique such as vacuum deposition, sputtering, ion plating or the like. Since this type of the magnetic recording medium includes no non-magnetic binder such as resin or the like in its magnetic layer, the magnetic material is high in packing density and hence even if the magnetic layer is thin, residual magnetic flux density can be increased. Therefore, this type of the magnetic recording medium is suitable for recording a short wave length signal.

Since, however, in this magnetic recording medium, total is exposed on the surface of the magnetic layer thereof, if the magnetic recording medium is, as it is, transported in contact with a magnetic transducer head, drum guide member and so on, due to the fact that the friction of the magnetic recording medium on the part in contact with the above elements is large, the magnetic recording medium is easily damaged. Therefore, such a trial has been carried out in general that a certain lubricant is coated on the surface of the magnetic layer to decrease its friction coefficient. In this case, however, since the magnetic recording medium includes no binder material as previously explained, the lubricant is merely coated on the metal surface of the magnetic layer. Therefore, when the magnetic recording medium is repeatedly transported in contact with the magnetic transducer head, the lubricant is easily peeled off from the metal surface and accordingly, the effect of the lubricant disappears in a short period of time.

OBJECTS AND SUMMARY OF THE INVENTION

Accordingly, it is an object of the present invention to provide an improved magnetic recording medium.

It is another object of the present invention to provide a magnetic recording medium having a thin film of ferromagnetic metal in which the runnability of the medium is improved.

It is a further object of the present invention to provide a magnetic recording medium having a thin film of ferromagnetic metal in which an improved durability is obtained.

According to an aspect of the present invention there is provided a magnetic recording medium which comprises: a non-magnetic substrate and a thin film metal magnetic layer formed thereon, said magnetic recording medium carrying polyphenyl ether compound having following formula:

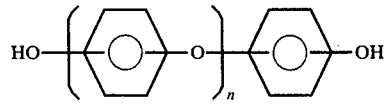

wherein n is an integer satisfying the following condition; $2 \leq n \leq 10$.

The other objects, features and advantages of the present invention will become apparent from the following description taken in conjunction with the accompanying drawings.

BRIEF DESCRIPTION OF THE DRAWINGS

FIG. 3 is a characteristic graph showing the variation of friction coefficient of the magnetic recording medium according to the invention versus the number of its transportations in contact with the head and so on.

DESCRIPTION OF THE PREFERRED EMBODIMENT

The present invention will be hereinafter described with reference to the attached drawings.

Figure 1:
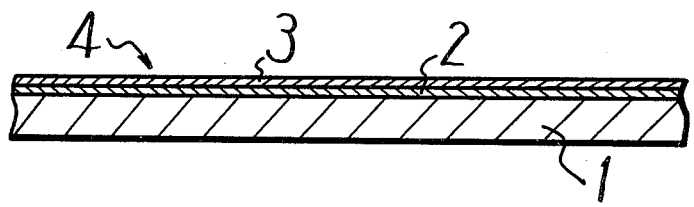
FIG. 1 is a cross-sectional view showing in an enlarged scale an example of the magnetic recording medium according to the present invention.

At first, the main feature of the magnetic recording medium according to the present invention resides in that on a thin film of magnetic metal coated is at least a polyphenyl ether layer. That is, according to the present invention, as shown in FIG. 1, on a non-magnetic substrate 1 deposited by, for example, a vacuum deposition technique is a metal magnetic thin film 2 such as Co film and on this metal magnetic thin film 2 formed by the coating is a polyphenyl ether protective film 3 made of polyphenyl ether compound with the following formula:

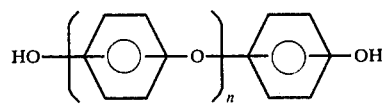

where $2 \leq n \leq 10$ to thereby form a magnetic recording medium 4.

The non-magnetic substrate 1 can be selectively made of various materials in accordance with the usage of the magnetic recording medium such as a polymer film made of polyethylenetelephthalate, polyethylene naphthalate, acetate, polyethylene, polyamide, polyimide or the like, an aluminum plate, a glass plate, a ceramic plate or the like.

As the ferromagnetic metal for making the magnetic layer or film, a single substance of Co, Fe, Ni or the like which are each ferromagnetic metal or an alloy thereof or a substance which is made by adding non-magnetic metal such as Cr or the like to the above ferromagnetic metals or alloy thereof so as to improve their various characteristics can be employed. In other words, it is needless that the material making the magnetic film is not specially limited.

The ferromagnetic metal thin film which forms the magnetic recording layer of the magnetic recording medium can be provided by the physical vapour deposition technique such as vacuum deposition, sputtering, ion plating or the like or electro or electroless plating from metal salt solution. In this case, in order to present magnetic anisotropy with respect to the lengthwise direction of the thin film, a slant vaporizing method or the like may be used in which the vapour of the magnetic metal is introduced to the substrate in an inclined or slant direction.

The polyphenyl ether used in the present invention is, for example, substance made by the Monsanto Industrial Chemicals Co. with the number of OS-124 or the like which is commercially available.

The polyphenyl ether film can be formed by such a manner that the polyphenyl ether is solved into a suitable organic solvent and then this solution is coated on the magnetic metal film. As the solvent for the polyphenyl ether, such as inert solvent can be used which is not reactive with the metal magnetic film and the polyphenyl ether, for example, Freon, methylethylketone or the like can be exemplified.

Although the protective layer made of polyphenyl ether is formed on the metal magnetic film, it may be coated on the other surface of the non-magnetic substrate.

The coating amount of the polyphenyl ether is desired to be selected as in the range from 1 to 100 mg/m² and more preferably 2 to 20 mg/m². The reason is that if the coating amount is too small such effects as stable runnability by decreasing friction and the improvement of durability are not appreciated while if the coating amount is too much, the effects are saturated which is meaningless.

In the magnetic recording medium of this invention constructed as above, since the polyphenyl ether serving as the lubricant contains the benzene ring in its molecule, it is thermally stable and is hardly decomposed in time lapse. Further, since the polyphenyl ether has the polarity due to ether bond, its adhesive strength to the metal magnetic film is large, functions as the lubricant good in durability and lowers or reduces the friction coefficient.

Now, an example of this invention will be described.

EXAMPLE

On a non-magnetic substrate made of a polyethylene-telephthalate film with the thickness of 14 μm, deposited by vacuum evaporation in which ferromagnetic vapour is introduced to the substrate with an inclined angle is a metal magnetic thin film composed mainly of cobalt Co with the thickness of 1000 Å. Then, on this magnetic thin film coated is 0.2% Freon solution of the polyphenyl ether (in its formula, n=4 and OS-124 made by the Mosanto Industrial Chemicals Co. can be exemplified) in such a manner that when it is dried the amount of polyphenyl ether is 8 mg/m². Thus, a magnetic recording medium is manufactured.

Figure 2:
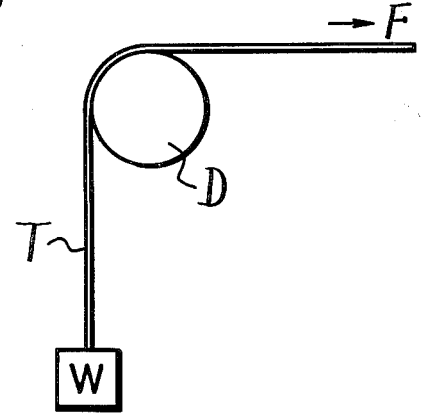
FIG. 2 is a schematic diagram used to explain a method of measuring a friction coefficient of the magnetic recording medium.

The friction coefficient of the magnetic recording medium or magnetic tape T thus made was measured by the test method shown in FIG. 2. That is, in a room in which the room temperature was 20° C. and the humidity was 60%, the magnetic tape T was contacted with a drum D whose surface is worked with 0.1 S and then transported by force F while in contact with the drum D at the speed of 1.4 mm/sec by applying a counter weight or load W of 50 g to the tape T and then the friction coefficient thereof was measured (in this case, the friction coefficient μ was calculated by the equation $$\mu = \left( \frac{2}{\pi} \ln \frac{F}{W} \right).$$

The friction coefficient of the tape T was measured at the first and 100th tape transportations in contact with the drum D.

The measured results were such that the friction coefficient μ was 0.26 at the first transportation and 0.28 at the 100th transportation. From the measured results, it was ascertained that there was substantially no variation in the friction coefficient between the first and 100th transportations and that the polyphenyl ether protective film coated on the magnetic thin film of the magnetic tape was hardly peeled off.

The friction coefficients μ of magnetic tapes with polyphenyl ether protective films the number n in the formula of which was varied were measured along the above mentioned test and the friction coefficient μ of a comparison magnetic tape with no polyphenyl ether protective tape was similarly measured. These measured results are shown in the following Table.

| n in polyphenyl ether formula | friction coefficient μ at 1st transportation | friction coefficient μ at 100th transportation |
|---|---|---|
| 1 | 0.29 | adhesion |
| 2 | 0.31 | 0.34 |
| 4 | 0.26 | 0.28 |
| 6 | 0.24 | 0.27 |
| 8 | 0.28 | 0.28 |
| 10 | 0.30 | 0.30 |
| 12 | 0.36 | 0.36 |
| Comparison Example with no polyphenyl ether protective film | 0.48 | adhesion |

Figure 3:
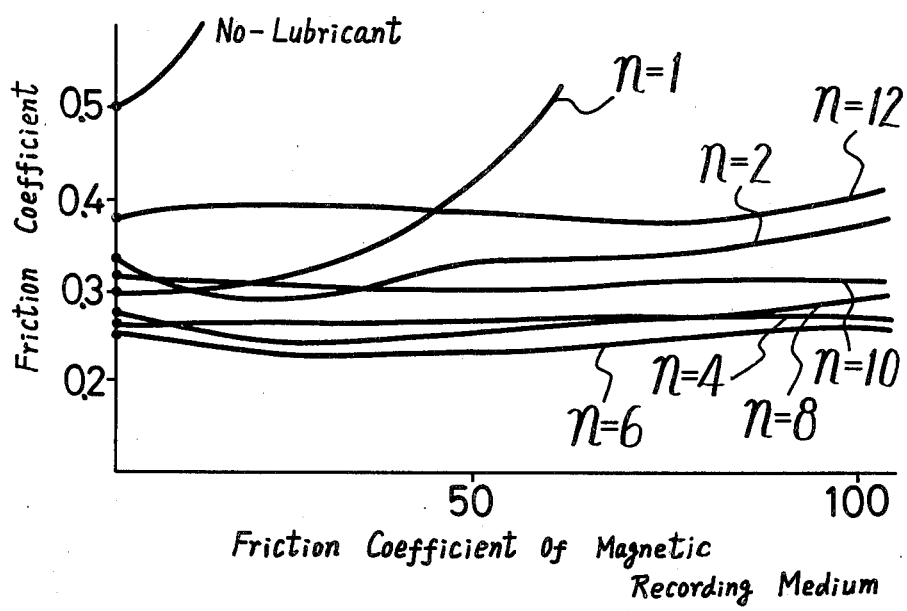

FIG. 3 is a graph showing the contents of the above table as characteristic curves.

As may be apparent from the above table, in case of the magnetic tape with no polyphenyl ether film, its friction coefficient even after one transportation (first transportation) in contact with the drum is large and adhesion appears in the magnetic tape after a number of transportations. On the other hand, in case of the magnetic tape with polyphenyl ether film, its friction coefficient is small, but in case of n=1 in the formula of the polyphenyl ether, adhesion occurs in the magnetic tape at 100th transportation and the durability of the magnetic tape becomes deteriorated, while in case of n=12 the polyphenyl ether film becomes nearly a solid and hence no effect to reduce its friction coefficient is obtained.

However, in case of n=2~10, the friction coefficients are substantially equal at first and 100th transportations and the durability becomes good. Further, in the above range of n, the friction coefficient is 0.24 to 0.34, namely the effect to reduce the friction coefficient is presented. Thus, n=2 to 10 in the formula of the polyphenyl ether is a useable range.

As the polyphenyl ether serving as the lubricant, fatty acid, ester of fatty acid and alcohol and so on, by way of example, may be mixed therewith.

As described above, in the magnetic recording medium according to the present invention, on its metal magnetic thin film coated is the polyphenyl ether which has good adhesion to the metal to form the protective film, so that after a number of the transportations thereof in contact with the magnetic transducer head and so on, the protective film which serves as the lubricant is not peeled off from the metal magnetic thin film. Therefore, the metal magnetic thin film can be perfectly protected and the magnetic recording medium can be transported in contact with the head and so on, whereby the durability of the magnetic recording medium is improved.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

We claim as our invention:

1. A magnetic recording medium comprising a nonmagnetic substrate and thin film metal magnetic layer formed thereon, said magnetic recording medium carrying polyphenyl ether compound having following formula

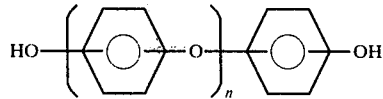

wherein n is an integer satisfying the following condition:

$$2 \leq n \leq 10.$$

2. A magnetic recording medium as claimed in claim 1, wherein said polyphenyl ether compound is formed on said magnetic layer.

3. A magnetic recording medium as claimed in claim 2, wherein said polyphenyl ether is coated on said magnetic layer with an amount between 1 and 100 mg/m$^2$.

4. A magnetic recording medium as claimed in claim 2, wherein said polyphenyl ether is coated on said magnetic layer with an amount between 2 and 20 mg/m$^2$.

5. A magnetic recording medium as claimed in claim 1, wherein said magnetic layer is magnetic metal formed by physical vapour deposition.

* * * * *